Jan. 7, 1964 L. F. BENDER 3,116,714
DAIRY EQUIPMENT FOR PULSATING MILK OR CLEANSING
LIQUID IN A FLUID HANDLING SYSTEM
Original Filed April 28, 1960 2 Sheets-Sheet 2
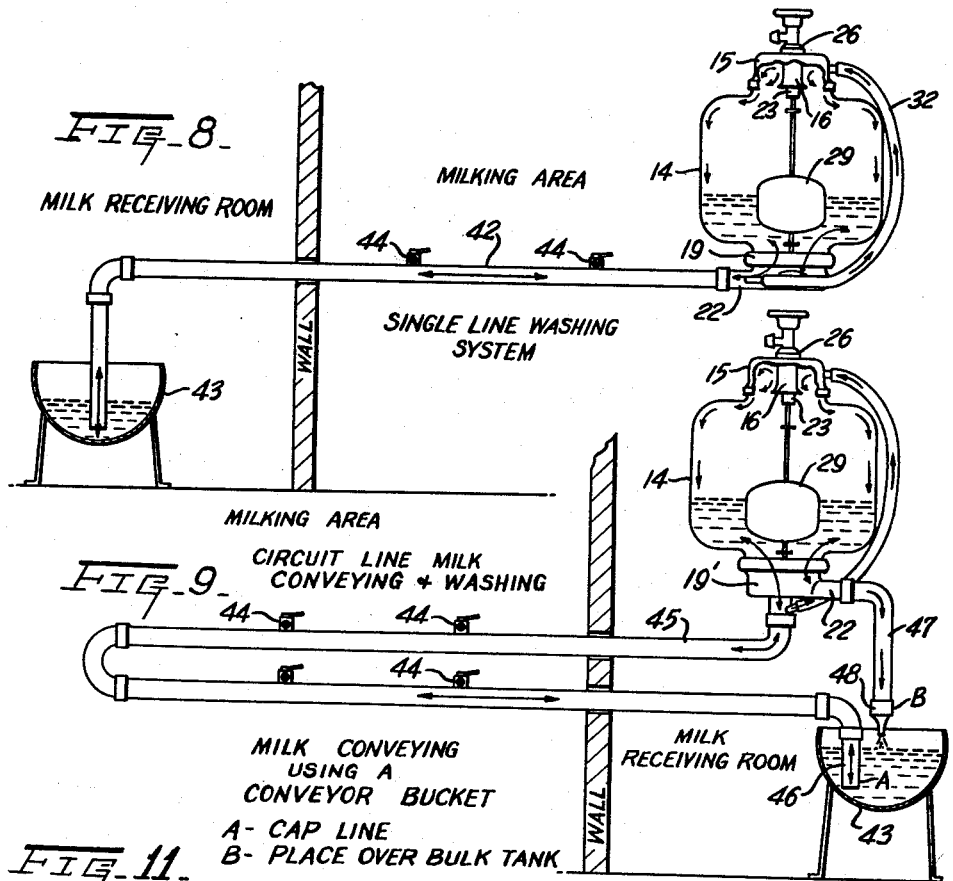
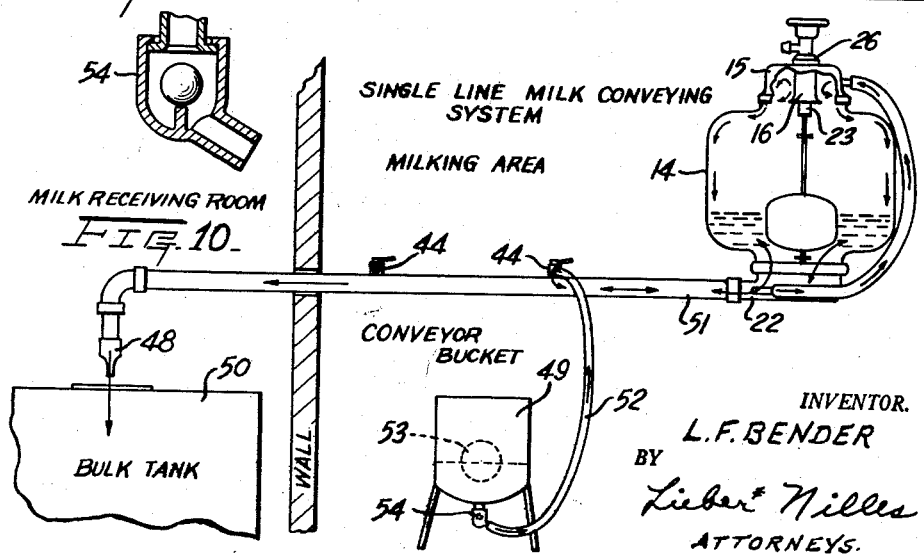
INVENTOR.
L. F. BENDER
BY
Lieber Nilles
ATTORNEYS.

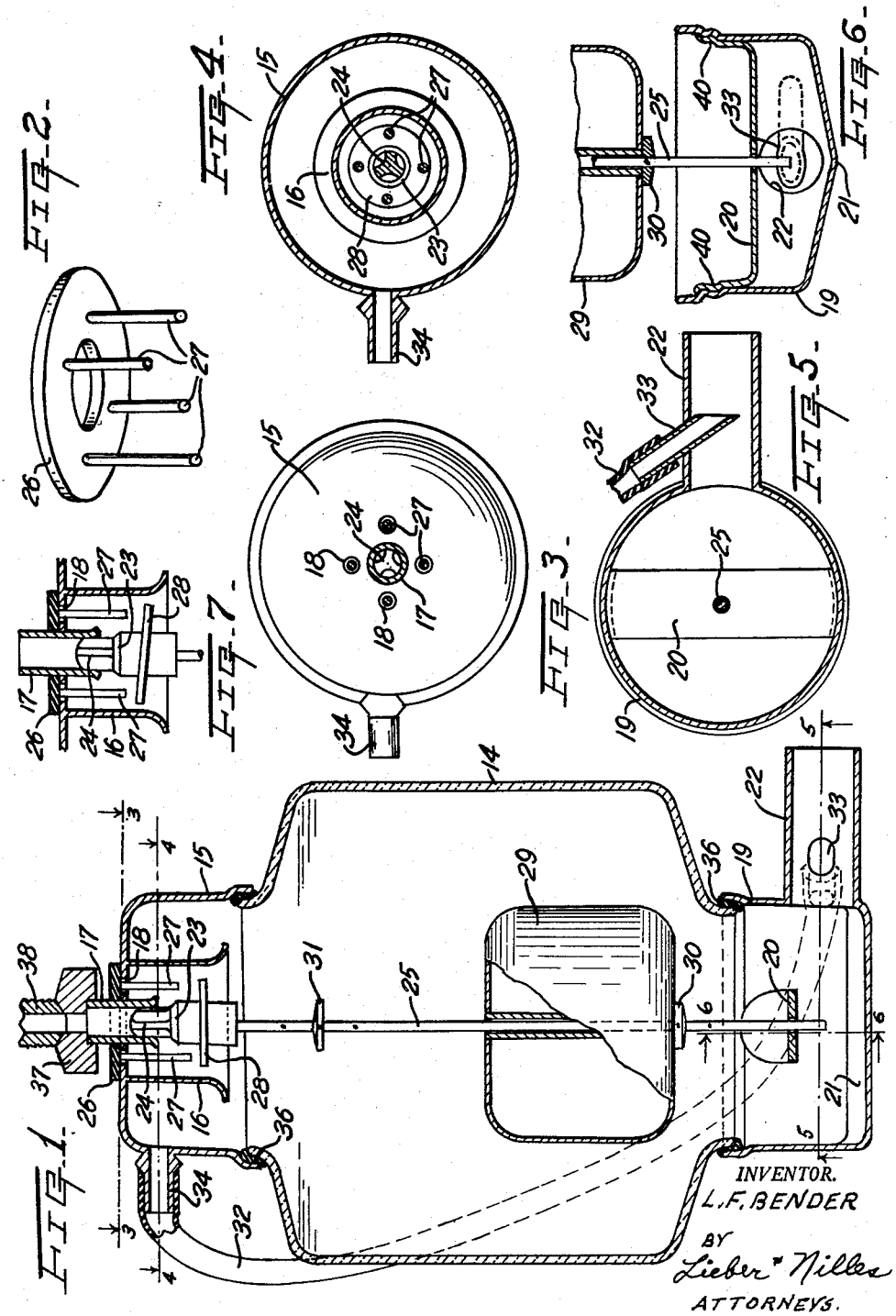

United States Patent Office 3,116,714
Patented Jan. 7, 1964

3,116,714
DAIRY EQUIPMENT FOR PULSATING MILK OR CLEANSING LIQUID IN A FLUID HANDLING SYSTEM
Lloyd F. Bender, Hayward, Wis.
Original application Apr. 28, 1960, Ser. No. 25,453, now Patent No. 3,052,190, dated Sept. 4, 1962. Divided and this application Aug. 20, 1962, Ser. No. 218,055
4 Claims. (Cl. 119—14.18)

This application is a division of application Serial Number 25,453, filed April 28, 1960, now Patent Number 3,052,190 granted September 4, 1962.

This invention relates to improvements in the art of conveying liquid such as milk and cleansing solution through the liquid conducting pipe lines of dairies, or the like.

Some of the more important specific objects of the invention are as follows:

To provide an improved milk transfer system which effectively eliminates undesirable foaming of the milk being transported from one locality to another by the device.

To provide an improved liquid propelling assemblage which may be utilized to interchangeably convey either milk or cleansing solution through the pipe lines of a milk conveying system.

To provide an improved automatically functioning milk transfer and pipe line cleansing system adapted to be used in diverse ways to facilitate dairy operations.

These and other objects and advantages of the invention will be apparent from the following description.

A clear conception of the several features constituting the present improvement, and of the construction and operation of diverse washer units and systems embodying the invention, may be had by referring to the accompanying drawings forming a part of this specification and wherein like reference characters designate the same or similar parts in the various views.

FIGURE 1 is a central vertical section through a commercial liquid pumping and milk line washing unit, showing the vacuum valve open and the air inlet valve closed;

FIGURE 2 is an enlarged side and bottom perspective view of one type of the improved atmospheric air inlet valve such as shown in FIGURE 1;

FIGURE 3 is a transverse horizontal section through the upper cup closure of the unit, taken along the line 3—3 of FIGURE 1;

FIGURE 4 is another transverse horizontal section through the same upper cup closure of the unit, taken along the line 4—4 of FIGURE 1;

FIGURE 5 is still another transverse horizontal section through the unit, taken along the line 5—5 of FIGURE 1;

FIGURE 6 is a transverse vertical section through the lower cup closure of the same unit, taken along the line 6—6 of FIGURE 1 but also showing a fragment of the valve actuating float in section;

FIGURE 7 is a fragmentary central transverse vertical section through a modified vacuum and air inlet control valve assemblage, and which is also applicable to a unit such as shown in FIGURE 1;

FIGURE 8 is a diagram showing a typical dairy installation embodying one of the improved units applied to a single liquid conveying line washing system associated with automatic milkers;

FIGURE 9 is another diagram showing a modified typical dairy installation embodying one of the new units applied to a circuit line conveying and washing system;

FIGURE 10 is still another diagram showing a further modified typical dairy installation also embodying one of the improved units applied to a single milk line conveying system associated with a milk dump tank; and FIGURE 11 is an enlarged section through a special valve associated with the dump tank of FIGURE 10.

While the invention has been shown and described herein as having been applied to only three different types of line washers and milk transporting systems, it is also advantageously applicable to many other types of such systems; and it is also contemplated that specific terms well known to the industry and which have been employed herein be given the broadest interpretation consistent with the actual disclosure.

Referring especially to FIGURES 1 to 6 inclusive of the drawing, the improved dairy equipment shown therein comprises in general, a transparent liquid receptacle 14 having open upper and lower ends; an inverted cup-shaped closure 15 sealingly cooperable with the upper receptacle end and having therein a fixed depending annular central wall 16 while its flat top is provided with a fixed central vacuum tube 17 and with a series of air inlet openings 18 both communicable with the receptacle interior within the wall 16; another cup-shaped closure 19 sealingly cooperable with the lower receptacle end and having therein a normally fixed but removable guide bar 20, while its bottom 21 is dished and its side wall is provided with a fixed liquid inlet and outlet connection 22 disposed approximately in alignment with the lower portion of the closure bottom 21; a vacuum valve 23 adapted to seat against the bottom of the tube 17 and having thereon a guide 24 slidable within this tube; an upright longitudinally reciprocable rod 25 secured to the vacuum valve 23 and extending through the receptacle 14 while being guided for rectilinear reciprocation by the guide bar 20 and guide 24; a flexible atmospheric air inlet disk valve 26 snugly embracing the tube 17 and having thereon a series of depending pins 27 passing with substantial clearance through the air inlet openings 18 within the wall 16, these pins being engageable by a flange 28 carried by the valve 23 to progressively uncover the openings 18 whenever the valve 23 is closing; a float 29 adapted to ride upon liquid in the receptacle 14 and to move along the rod 25 between adjustable lower and upper stops 30, 31 respectively secured to this rod; and a hose 32 connecting an outlet nipple 33 in the connection 22 with a nipple 34 for directing liquid into the upper closure 15 toward the periphery of the central wall 16.

The receptacle 14 is preferably formed of shatterproof glass or other durable transparent material, and the closures 15, 19 coact with the receptacle ends through gaskets 36 of rubber or the like. The upper end of the vacuum tube 17 is engaged by a clamping block 37 having therein a vacuum passage connecting the interior of the receptacle 14 with a vacuum source through a threaded nipple 38, and the entire washing and pumping unit is adapted to be supported in a C-shaped frame not shown but which coacts with the nipple 38 and with the lower end portion of the receptacle 14 and which is adapted to be mounted upon a wall or the like in a well-known manner. The closures 15, 19 are preferably formed of corrosion resistant sheet metal such as stainless steel, and the depending annular wall 16 of the upper closure 15 should extend below the inwardly directed liquid inlet nipple 34 and has its lower extremity flared outwardly as shown in FIGURES 1 and 4, in order to convert the cascading liquid which is delivered by this nipple 34 against the exterior of the wall 16 into an annular outwardly and downwardly directed film falling by gravity into the receptacle 14.

The liquid supply and exhaust connection 22 of the lower closure 19 is located as near as possible to the lowermost portion of the centrally dished bottom 21 of this closure in order to insure complete drainage of liquid from within the closure 19 whenever the vacuum valve 23 is closed and the air admission valve 26 is open;

3 and the guide bar 20 which spans the interior of the closure 19 is formed of resilient metal and has its opposite upstanding ends provided with outwardly directed ridges 40 adapted to be snapped into grooves or over the upper off-set at the brim of the cup, as shown in FIGURE 6 in order to detachably retain the bar 20 in position. The liquid inlet nipple 33 which is secured to the liquid connection 22 of the lower closure 19 preferably extends at an angle away from this connection as shown in FIGURES 1, 5 and 6 in order to avoid excessive obstruction to the flow of liquid into and out of the unit, and to also cause the liquid which is by-passed through the flexible hose 32 and nipple 34 into the upper closure 15 to flow at relatively high velocity.

The vacuum control valve 23 which is adapted to seat against the lower end of the air outlet tube 17 and the upper extension guide 24 of which is slidable within this tube and cooperates with the guide bar 20 to confine the rod 25 to rectilinear reciprocation may be variably weighted to counteract sudden closure thereof by the rising float 29 which is seated to confine air therein and is adapted to travel along the rod 25 between the stops 30, 31. The flexible air inlet disk valve 26 which snugly embraces the vacuum tube 17 and which carries the rigid depending pins 27 may be formed of relatively soft rubber so that different peripheral portions thereof may flex independently of others in order to unseat the air inlet openings 18 in succession when the vacuum valve 23 is closing. As shown in FIGURES 1 and 2, these pins 27 are of progressively different lengths and the actuating disk 28 carried by the vacuum valve 23 and which successively engages the pins 27 of diminishing lengths whenever the valve 23 is closing will produce the desired gradual opening of the air ports or openings 18. However, as shown in the modification of FIGURE 7, the same desirable action may be obtained by making all of the pins 27' of the same length and by inclining the disk 28' relative to the central axis of the valve 23, and in either case the disk valve 26 should coact with the flat top of the upper closure 25 to seal the openings 18 when the vacuum valve 23 is wide open.

When the various parts of the improved unit have been properly constructed and assembled as above described, it may be utilized either to pulstate washing and sterilizing liquid derived from a source of supply, back and forth through a pipe line, or to pump milk derived from milking machine teat cups connected to such a conveying line to a storage tank. In either case the unit will function automatically as shown by the arrows in the diagrams of FIGURES 8 to 10 inclusive; and in all cases, when the tube 17 is connected to a source of vacuum liquid will be drawn through the connection 22 into the bottom of the receptacle 14 and will cause the float 29 to rise and eventually close the valve 23 whenever the float engages the upper stop 31 on the rod 25. During such entry of liquid, a portion of the liquid will flow through the hose 32 and will be delivered against the annular wall 16 which converts the by-passed liquid into an annular spreading film dropping into the receptacle and preventing excessive foaming of the liquid rising through the bottom closure 19, especially when this liquid is fresh milk. While the vacuum valve 23 is closing, the air admission ports or openings 18 will be gradually opened by the disk 28 and pins 27 to admit atmospheric air into the receptacle 14 and these air inlet openings 18 will be wide open when the vacuum valve 23 is fully closed, whereupon the air pressure within the receptacle will cause the liquid to gravitate through the connection 22 until the float 29 engages the lower stop 30 on the rod 25 and thereby opens the valve 23 while permitting the valve 26 to close the air inlet openings 18. This cycle of operation will continue automatically as long as the tube 17 is connected to the vacuum source, and without further attention.

Referring specifically to the diagram of FIGURE 8, here the washing unit is shown as being utilized to wash and sterilize a single liquid conducting line 42 of considerable length, and wherein the unit is connected to one end of this line within one room such as the milking area of a dairy, while the opposite end of the line 42 is immersed within a supply of cleansing liquid confined within a tank 43 located in another room such as the milk receiving and storing and treating room. When this system is functioning merely as a line washer the milking machine connecting valves 44 in the line 42 will be closed.

In the diagram of FIGURE 9, the unit is shown as being utilized in conjunction with a circuit line 45 of considerable length having a return bend and sections provided with a plurality of milking machine connecting valves 44 located within the milking area, while the milk conveying and washing unit is confined in the milk receiving room. One end of the circuit line 45 is connected directly to the lowermost portion of a bottom closure 19' while its opposite end 46 extends into a tank 43 which is adapted to either contain cleansing solution when the line 45 is being washed and the valves 44 are closed, or to receive bulk milk from the milking machine when the remote end of the line within the tank is plugged or capped and the valves 44 are open. In this interchangeable installation the lower closure 19' of the line washing and milk conveying unit is provided with an additional milk delivery tube 47 attached to the connection 22 and having a reed valve 48 at its outlet end for discharging milk into the tank 43 when the cleansing solution has been removed, and the hose 32 connects the upper closure 15 with the line 45 through a well at the bottom of the closure 19'.

In the diagram of FIGURE 10, the unit is shown as being utilized to convey bulk milk from a dump tank 49 located within the milking area into a bulk tank 50 or cooler disposed within a receiving room, through a single liquid conducting line 51 having a series of valves 44 associated therewith. The connection 22 of the unit is connected to one extreme end of the line 51 and the opposite end of this line is provided with a reed valve 48 directed into the tank 50, while the dump tank 50 is upwardly open to receive milk and has its lowermost portion connected with one of the inlet valves 44 by a tube 52. All of the remaining valves 44 in the pipe line 51 are closed and the interior of the tank 49 is provided with a ball valve 53 which floats on the milk but closes the tank outlet when no liquid is present, while the inlet end of the tube 52 is provided with a special check valve such as shown enlarged in FIGURE 11 for positively preventing return flow of liquid from the line 51 to the tank 49.

It will thus be noted that the improved unit is susceptible of many uses in dairies, to either pulsate washing and sterilizing solutions through milking machine lines of various lengths, or to transport milk from place to place. The foam eliminating wall 16 disposed within the upper closure effectively prevents excessive accumulation of foam within the receptacle 14, and the invention has proven highly satisfactory and successful in actual use.

Various modes of carrying out the invention are contemplated as being within the scope of the following claims particularly pointing out and distinctly claiming the subject matter which is regarded as the invention.

I claim:

1. In combination, a milk transporting line having a number of spaced inlets communicable with milking machine parts to normally introduce milk into the line, a tank containing a liquid within which one end of the line is submerged, a pulsating unit connected to the opposite end of said line and being operable to pulsate liquid from said tank through the line when said inlets are closed, and means associated with said unit for by-passing some of the liquid and for utilizing the by-passed liquid to eliminate foaming of the pulsated liquid.

2. In combination, a milk conveying line having a number of valve controlled spaced inlets communicable with milk supply sources, one end of the line being directed into a tank, a pulsating unit for the line having a receptacle the lower portion of which is connected to the opposite end of the line, means associated with said unit and being operable to pump liquid admitted to the line through one of said inlets into said tank, and means for by-passing and cascading some of the liquid through an upper portion of said receptacle to prevent excessive foaming of the liquid admitted to the lower receptacle portion.

3. In combination, a milk conveying line having a number of valve controlled spaced inlets communicable with milk supply sources, one end of the line being directed into a tank, a pulsating unit for the line having a receptacle the lower portion of which is connected to the opposite end of the line, means associated with said unit and being operable to pump liquid admitted to the line through one of said inlets into said tank, means for by-passing and cascading some of the liquid through an upper portion of said receptacle to prevent excessive foaming of the liquid admitted to the lower receptacle portion, and a dump tank communicating with the inlet through which liquid is admitted to said line.

4. In combination, a milk conveying line having a number of valve controlled spaced inlets communicable with milk supply sources, one end of the line being directed into a tank, a pulsating unit for the line having a receptacle provided with an annular depending upper wall and the lower portion of which is connected to the opposite end of the line, means associated with said unit and being operable to pump liquid admitted to the line through one of said inlets into said tank, and means for by-passing and cascading some of the liquid through an upper portion of said receptacle and against said wall to prevent excessive foaming of the liquid admitted to the lower receptacle portion.

References Cited in the file of this patent

UNITED STATES PATENTS

| | | |
|---|---|---|
| 2,733,667 | Hill | Feb. 7, 1956 |
| 2,895,450 | Hope | July 21, 1959 |
| 2,897,827 | Dromgold | Aug. 4, 1959 |
| 2,997,049 | Thomas | Aug. 22, 1961 |

FOREIGN PATENTS

| | | |
|---|---|---|
| 797,145 | Great Britain | June 25, 1958 |